Sept. 10, 1929.  A. SVENN ET AL  1,727,913
ELECTRIC HEATING ELEMENT FOR HOT WATER BOTTLES
Filed June 9, 1928

ALFRED SVENN
ARTHUR SODERHOLM
INVENTORS

PER
Albert J. Fihe
ATTORNEY

Patented Sept. 10, 1929.

1,727,913

UNITED STATES PATENT OFFICE.

ALFRED SVENN AND ARTHUR SODERHOLM, OF CHICAGO, ILLINOIS.

ELECTRIC HEATING ELEMENT FOR HOT-WATER BOTTLES.

Application filed June 9, 1928. Serial No. 284,095.

This invention relates to improvements in an electric heating element for a hot water bottle or the like and has for one of its principal objects the provision of means for maintaining the water in the bag at a constant warm temperature when the bag is being used, and for automatically disconnecting the current supply when the bag is not being used.

One of the important objects of the invention is to provide a combination hot water bottle stopper and electric heating element which extends into the bag and makes contact with the water contained therein and heats the same when the bag is in a prone position and which will shut off the current supply when the bag is in an upright position.

Another important object of the invention is the provision of an automatic switch for a hot water bag heating element which is "fool proof" and cannot possibly be tampered with or become out of order.

Other and further important objects of the invention will be apparent from the disclosures in the accompanying drawings and following specification.

The invention, in a preferred form, is illustrated in the drawings and hereinafter more fully described.

Figure 1:
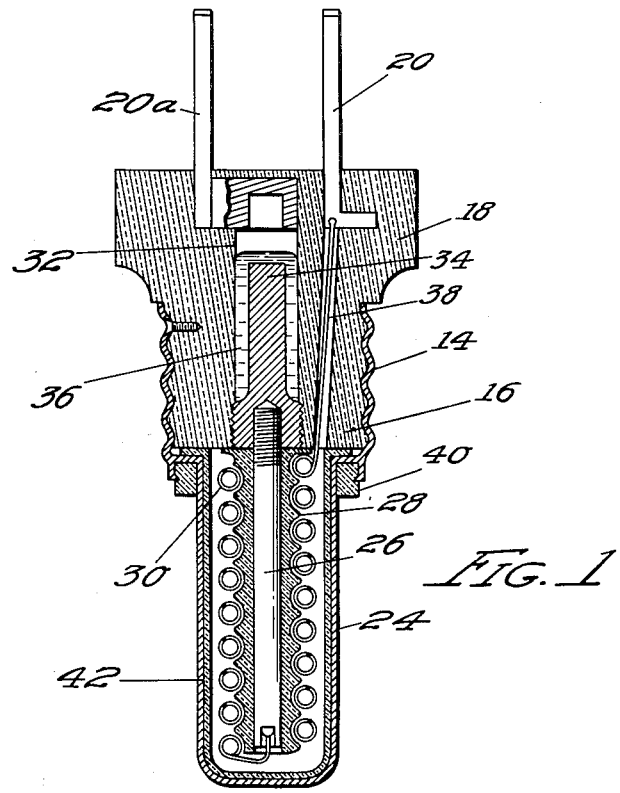
Figure 1 is a vertical sectional view of the combination hot water bottle plug and heating element, the electrical circuit being shown in open position.

The reference numeral 10 indicates generally the usual hot water bottle, constructed of rubber or such like material, having an internally threaded neck 12 adapted to engage threads 14 of a stopper 16, which in this case, is a combination plug and heating element.

The upper portion 18 of the plug is constructed of fibre, hard rubber or some other like insulating material and embedded therein and extending upwardly therefrom are two contact making prongs 20 and 20ª, adapted to be inserted in a usual electric connecting plug 22.

The lower portion of the plug 16 terminates in a completely enclosed waterproof cylindrical casing 24, constructed of brass or some such non-rusting material. Contained within the cylindrical casing 24 is a depending metallic rod 26 covered with an insulating material 28 such as mica or the like. A heating coil 30 is wound upon the rod 26 and is insulated from the said rod by the insulation 28, the lower terminal of the said coil being connected to the lower end of the rod.

The member 16 is provided with a cylindrical opening 32, into which a metallic member 34 is threadedly positioned. The rod 26 is threadedly mounted in the member 34 and makes electrical contact therewith. The diameter of the member 34 is smaller than the diameter of the cylindrical opening 32 and is adapted to be submerged in a mercury bath 36. The quantity of mercury used is sufficient to cover the top of the member 34 when the plug is in an upright position, as shown best in Figure 1, but is not sufficient to reach the top of the opening 32, which comprises an integral portion of the prong 20ª.

The prong 20 is connected directly to the heating element 30 by means of a connector 38. Hence, it is apparent that when the plug is sufficiently tilted the mercury will bridge the gap between the upper portion of the member 34 and the lower portion of the prong 20ª thus completing the electrical circuit, as shown in Figure 2.

Figure 2:
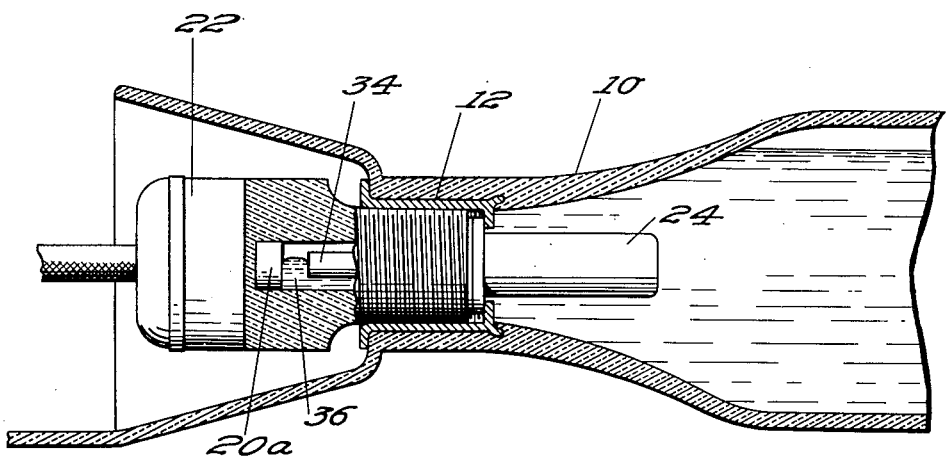
Figure 2 is a fragmentary sectional view of the plug and heating element mounted in a hot water bottle, the electrical circuit being closed.

A hot water bottle is usually used in a prone position, as shown best in Figure 2, therefore, the heating element is energized by the bridging of the gap between the member 34 and the prong 20ª.

A bushing or washer 40 constructed of some resilient substance makes a water-tight closure upon the bag, and as an added safety measure the inner surface of the member 24 is lined with insulating material 42 which eliminates any possibility of short circuiting or grounding the heating coil 30. The space around the coil 30 may be filled with an electrical insulator, if desired.

It is apparent that herein is provided a device which is both rugged and efficient. It can be readily manufactured and economically marketed and will appeal to anyone who has had the annoying experience of continually refilling a hot water bottle to keep the same at a desired temperature.

We are aware that many changes may be made and numerous details of construction varied throughout a wide range without departing from the principles of this invention, and we therefore do not propose limiting the patent granted hereon otherwise than as necessitated by the prior art.

We claim as our invention:

A combination hot water bag stopper and heating element, including a threaded plug, an integral extension depending from the bottom of the plug, a heating element contained within the extension, a pair of contact prongs projecting from the top of the plug, one terminus of the heating element being connected to one of the prongs, the other end of the heating element terminating in a contacting member, a mercury bath enveloping the upper portion of the contacting member, the other prong being adjacent the upper portion of the mercury bath.

In testimony whereof we affix our signatures.

ALFRED SVENN.
ARTHUR SODERHOLM.